June 22, 1965    R. B. STAUB ETAL    3,190,482
SEALING DISC FOR CONTAINER CLOSURE
Filed Dec. 31, 1962    3 Sheets-Sheet 2
FIG. 3
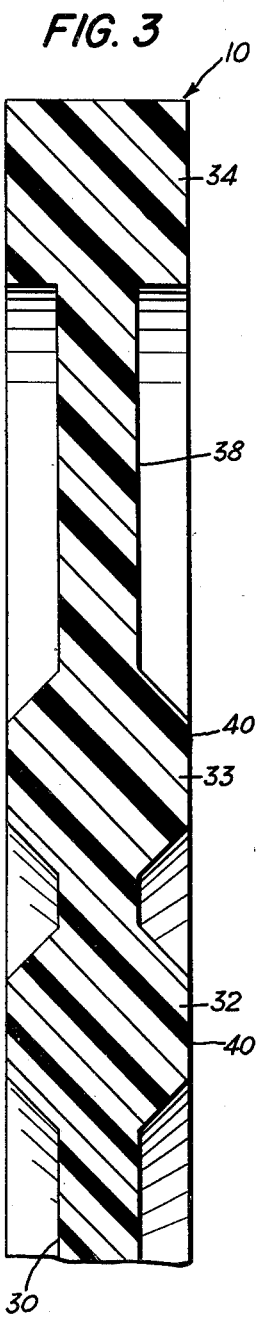
FIG. 4
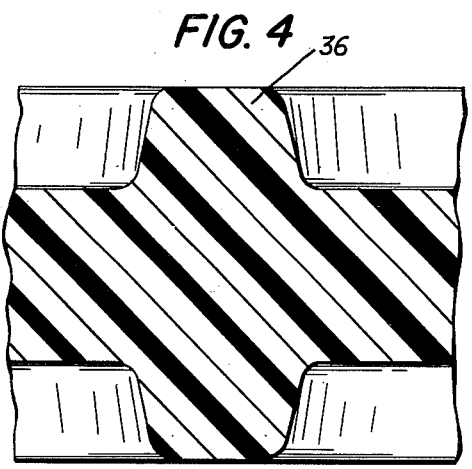
FIG. 5a
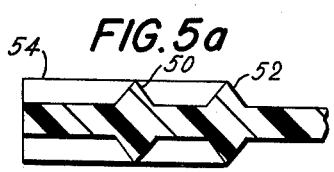
FIG. 5b
FIG. 5c
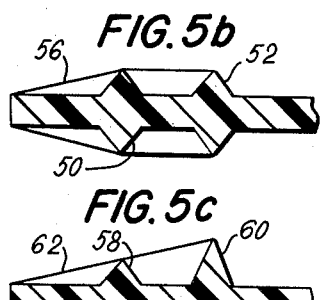
FIG. 5d
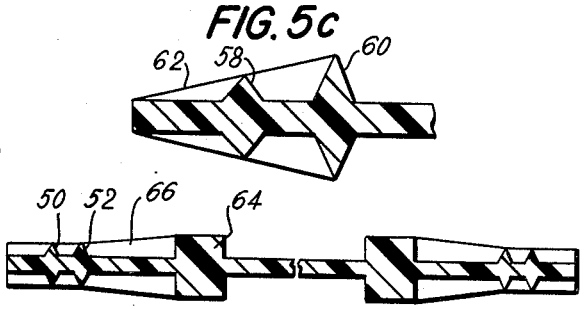
INVENTORS
ROGER B. STAUB
PETER H. HOFER
BY
ATTORNEY

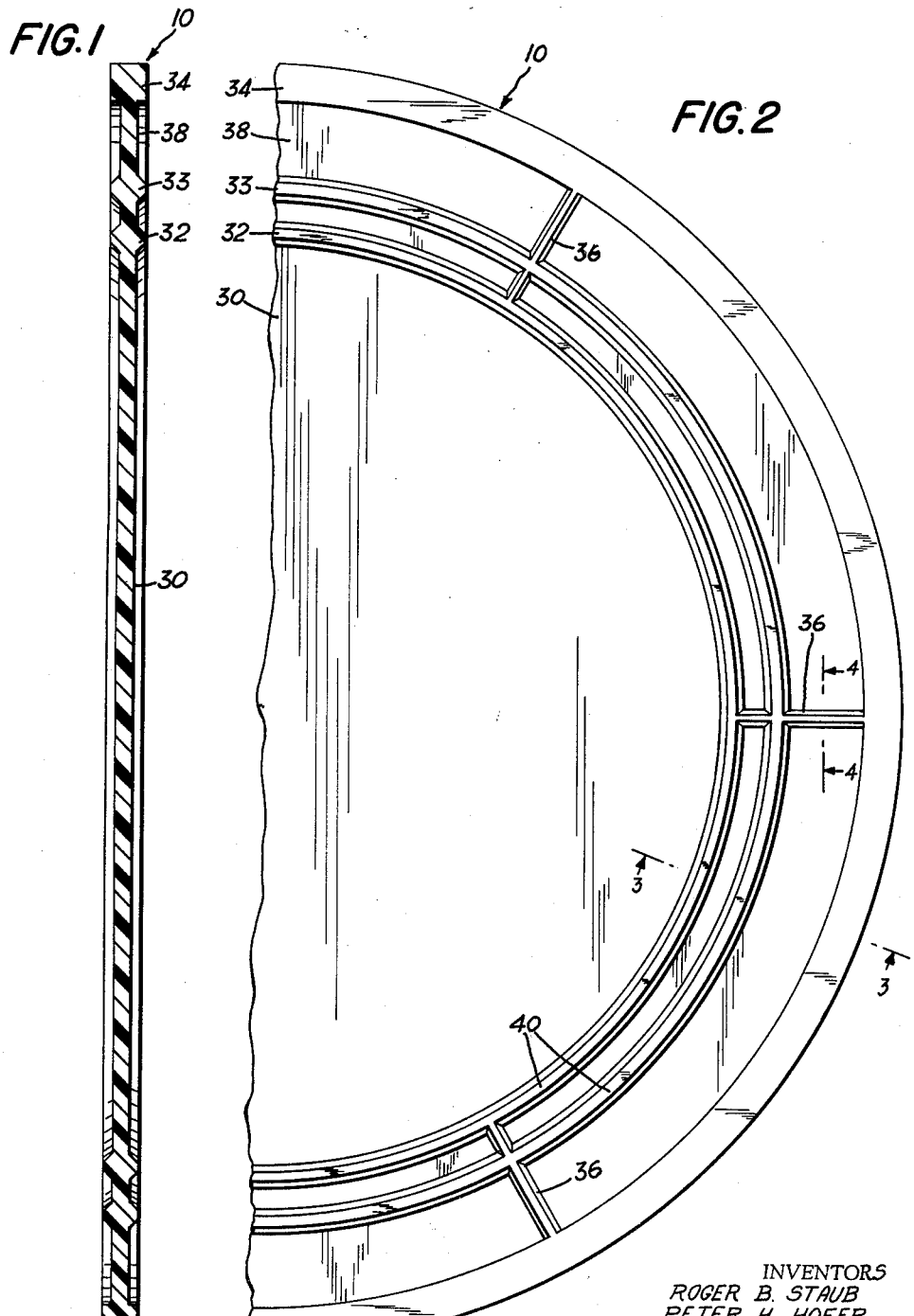

INVENTORS
ROGER B. STAUB
PETER H. HOFER
BY
ATTORNEY 3,190,482
SEALING DISC FOR CONTAINER CLOSURE
Roger B. Staub, Somerville, and Peter H. Hofer, Berkeley Heights, N.J., assignors to Union Carbide Corporation, a corporation of New York
Filed Dec. 31, 1962, Ser. No. 248,311
2 Claims. (Cl. 215—40)

The present invention relates generally to sealing discs for container closures and, more particularly, to a sealing disc which provides good sealing properties and does not nest or interlock with like sealing discs when stacked in conventional assembly machines.

Heretofore, a great variety of sealing discs have been proposed for use in container closures such as crown caps, screw caps, and the like. More recently, there has been a growing use of sealing discs made of plastic, such as polyethylene, and many different structural configurations have been proposed for the plastic discs. In general, these various structures have included a plurality of protruding circular beads for various purposes, such as to provide sealing surfaces which fit against the lip of the container to be sealed.

However, because of such protruding beads, many of the previously proposed seals have not been capable of use in conventional assembling machines which place the sealing discs in the container closures. For example, in the high-speed assembling machines for placing sealing discs in crown caps, the protruding beads cause the seals to nest together or interlock when stacked in the seal feed tubes. Also, as the seals are ejected from the feed tubes in such machines, the beads of the seals being ejected often catch with the protruding beads of the adjacent seal, resulting in tearing, jamming, or the ejection of a plurality of seals.

It is, therefore, the main object of the present invention to provide an improved seal structure which eliminates the problems of nesting, interlocking, and catching.

It is another object of the invention to provide such a seal which has protruding circular beads.

It is a further object of the invention to provide such a seal which is made of a plastic material.

Other aims and advantages of the invention will be apparent from the following description and appended claims.

In the drawings:

FIG. 1 is a cross-sectional view of a preferred embodiment of the inventive closure seal;

FIG. 2 is a plan view of the seal of FIG. 1;

FIG. 3 is an enlarged cross-sectional view taken on line 3—3 of FIG. 2;

FIG. 4 is an enlarged cross-sectional view taken on line 4—4 in FIG. 2;

FIG. 5 is a series of cross-sectional views of several different embodiments of the inventive seal;

Figure 7:
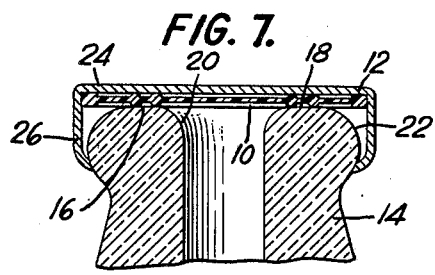
FIG. 7 is a cross-sectional elevation view of the neck or mouth of a bottle, a crown closure, and the seal of FIG. 1, the closure and seal being shown as set on the bottle, but not secured thereto.

As used herein, the terms "axis" and "radius" refer to the axis and radius of the thin cylinder defined by the outer extremities of the sealing disc. The term "thickness" refers to dimensions in the axial direction, and the term "width" refers to dimensions in the radial direction.

In accordance with the present invention, there is provided a closure seal for a container closure adapted for use on an open-mouth container having a sealing surface surrounding the orifice of the container mouth, the closure seal comprising a plastic disc having at least two circular beads protruding therefrom; and a plurality of transverse ribs extending between each pair of adjacent beads so that the closure seal will stack vertically with like closure seals and slide thereover without interlocking.

By providing transverse ribs between the protruding beads, the present invention provides an improved closure seal which achieves good sealing and yet will stack vertically with like closure seals and slide thereover without interlocking. Any number of protruding beads may be provided at any desired locations on the sealing disc, as long as a plurality of transverse ribs are provided between each pair of protruding beads. At least a portion of each rib should be at least as thick as the thicker of the beads which it extends between, although this thickness need not be maintained for the full transverse length of the rib. These transverse ribs prevent the protruding beads on adjacent seals from overlapping each other (in the axial direction) in the grooves or valleys between the beads, thus preventing the seals from nesting or interlocking with each other when they are stacked vertically and from catching in each other as they are ejected from the vertical stack. In most cases, it is preferred to have the transverse ribs extend continuously from the radially innermost bead to the periphery of the seal.

The inventive closure seal may be made from any suitable plastic material, such as polyethylene or polyvinyl chloride. The material should be resilient so that it maintains an effective seal between the container and the container closure as they are displaced relative to each other, such as during shipping or handling shocks, temperature changes, and the like. The resiliency of the plastic material enables the seal to compensate for imperfections in the container sealing surface and also for the difference in the coefficients of thermal expansion of the container and closure materials, such as glass and steel in the case of crowned bottles. It is important to maintain an effective seal between the container and the container closure to preserve the contents of the container, especially in cases where the contents are packaged under increased or reduced pressures. It is usually preferred to use a material with a low gas permeability so as to prevent the passage of gases, such as oxygen or carbon dioxide, into or out of the container to be sealed. The seal material should also be substantially tasteless and odorless; polyethylene, which normally does not contain plasticizers, is particularly good in this regard.

The overall diameter of the closure seal is preferably about equal to or slightly less than the inside diameter of the closure so that it can be easily inserted into the closure. However, in some cases it is desirable to have the diameter of the seal slightly greater than the inside diameter of the closure so that the seal is frictionally retained within the closure.

The protruding beads on the inventive closure seal may vary widely in number, location, shape, and dimensions. The beads may be located either over the container orifice or to engage various portions of the container sealing surface. Also, one of the beads may be located on the periphery of the disc. It is preferred that at least one sealing bead engage the uppermost portion of the container sealing surface in order to achieve the most effective sealing when the closure is pressed downwardly onto the container. Alternatively, however, the sealing beads may be located so as to engage either the inner or outer flank of the container sealing surface. When a plurality of sealing beads are employed, they may engage the container sealing surface at any or all of these points, and it is preferred that the beads be concentric. When one or more beads are located over the container orifice, they may be used to press the central portion of the seal downwardly into the mouth of the container, thus increasing the sealing action of the seal on that portion of the container sealing surface immediately adjacent to the mouth orifice. Beads located over the container orifice may also be made thicker than the outer sealing beads to further insure against nesting of the seals.

The cross sectional shape and dimensions of the protruding beads may vary widely. The preferred cross sectional shape for the sealing beads, i.e., the beads that are positioned to engage the container sealing surface, is trapezoidal with the shorter of the two parallel sides of the trapezoid being at the outer extremity of the bead. This shape provides a relatively small sealing surface on the extremity of the bead to concentrate the sealing force and to facilitate compression and deformation of the bead, and yet the wide base formed by the longer parallel side of the trapezoid prevents transverse bending of the bead. The flat sealing surface in this configuration also provides further protection against interlocking of the seals and provides an optimum sealing surface which prevents overstressing of the sealing area.

However, other cross sectional shapes, such as triangular, rectangular, semicircular, semielliptical, and the like, may also be used. The dimensions of the sealing beads must be such as to provide a good seal and depend largely on the particular application of the seal, i.e., the type of container and container closure being used. In cases where a plurality of sealing beads are employed, it is not necessary that all beads have the same shape or dimensions.

Although the term "bead" as used herein refers to projections on one or both sides of the plastic disc, it is generally preferred to have symmetrical arrangements of beads on the two sides of the disc. In other words, the seal is preferably substantially symmetrical about a plane through the middle of the disc and perpendicular to its axis. This symmetry makes both sides of the seal useable and obviates the sorting that would be necessary in the stacking of non-symmetrical seals.

The invention will be described in more detail by referring to the drawings.

FIG. 7 is a cross sectional elevation view of a preferred closure seal 10 for a short-skirt crown cap 12 adapted for use on an open-mouth bottle 14 having a sealing surface 16 surrounding the orifice of the mouth. The crown cap 12 comprises a top portion 24 having an outer diameter of 1.083 inches and a tapered fluted skirt portion 26 (height of about 0.228 inch). The sealing surface 16 of the bottle 14 comprises a substantially flat uppermost portion 18, an inner flank 20, and an outer flank 22.

The closure seal 10 is shown more clearly in the plan view of FIG. 2 and the cross-sectional views of FIGS. 1 and 3. The seal 10 comprises a polyethylene disc having a relatively thin circular central portion 30, three relatively thick concentric circular beads 32, 33, and 34 encircling the central portion 30, and six radial ribs 36 extending between the three protruding beads 32, 33, and 34. The overall diameter of the closure seal 10 is 1.050 inches, which is the same as the inside diameter of the top portion 26 of the crown cap. The central portion 30 of the seal 10 is 0.017 inch in thickness and 0.734 inch in diameter. Although the central portion 30 as shown is solid, it may be apertured if desired.

Each of the three circular beads 32, 33, and 34 protrudes about 0.008 inch beyond the surface of the central portion 30. The outermost bead 34 has a rectangular cross sectional shape (width of 0.026 inch) and is located on the periphery of the disc; this bead functions mainly as a supporting member to increase the rigidity of the seal and to facilitate ejection of the seal from the feed tube in the assembly machine. The two inner beads 32 and 33 act as sealing beads and are positioned to engage the flat uppermost extremity 18 of the container sealing surface. The cross sectional shape of these sealing beads is trapezoidal with the shorter of the two parallel sides of the trapezoid forming a narrow flat sealing surface 40. The sealing surface 40 is 0.015 inch wide, the base of the trapezoid is 0.030 inch wide, and the distance between the two beads 32 and 33 is 0.008 inch, as measured at the bases thereof. The sides of the beads 32 and 33 (the non-parallel sides of the trapezoid) are symmetrical and form angles of about 45° with the horizontal plane of the disc.

The membrane-like area 38 between the beads 33 and 34 forms a flex-ring which provides the outer portion of the seal with flexibility and facilitates the pressing of the bead 34 down onto the sloping outer surface of the bottle lip.

As shown most clearly in FIG. 2, the six radial ribs 36 extend between both pairs of adjacent protruding beads, i.e., surface in order to achieve a good seal. The minimum requirement with respect to the transverse ribs is that there be a plurality of ribs between each pair of adjacent beads and that at least a portion of each rib be at least as thick as the thicker of the beads which it connects. The number of ribs required depends somewhat on the particular structural configuration employed, but at least three equally spaced ribs are required for most seals.

Several different embodiments of the present invention as applied to various seal designs are shown in FIGS. 5a through 5d. In FIG. 5a, two sealing beads 50 and 52 of equal thickness are connected by ribs 54 of the same thickness as the beads. Although there is no protruding bead on the periphery of this seal, the ribs 54 are still preferably extended to the periphery of the seal. FIG. 5b shows a seal which is the same as that of FIG. 5a except that the ribs 56 are tapered between the outermost bead 50 and the periphery of the seal. In FIG. 5c, two sealing beads 58 and 60 of different thickness are connected by ribs 62 which taper downwardly from the higher bead 60 to the lower bead 58 to the periphery of the disc. This embodiment shows that while at least a portion of each transverse rib must be at least as thick as the thicker of the beads which it extends between, the maximum thickness need not be maintained for the full radial length of the rib. The seal in FIG. 5d is the same as that in FIG. 5a with the addition of a bead 64 located in the center of the disc over the container orifice, and ribs 66 tapering downwardly from the bead 64 to the sealing bead 52. The bead 64 is both wider and thicker than the sealing beads 50 and 52 to further insure against nesting or interlocking. Also, as the top portion of the closure presses downwardly on the bead 64, it presses the center portion of the seal down into the container mouth, thereby increasing the pressure of the seal against the inner portion of the container lip.

Figure 6A:
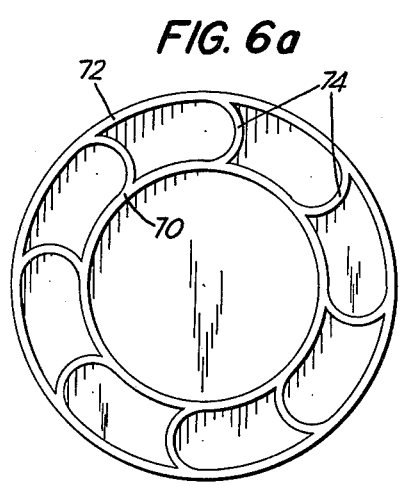
FIG. 6 is a series of plan views of several different embodiments of the inventive seal.
Figure 6B:
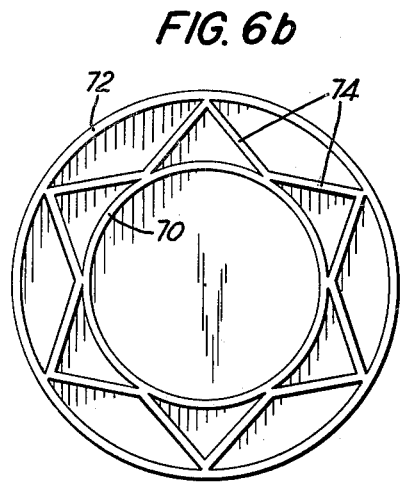
Figure 6C:
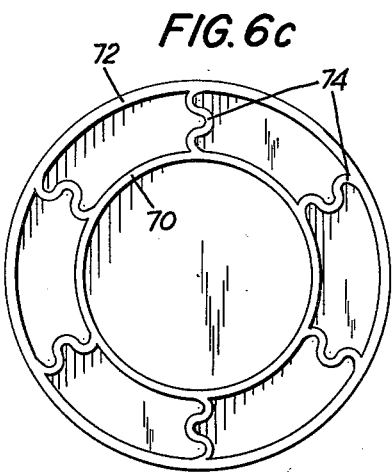
Figure 6D:
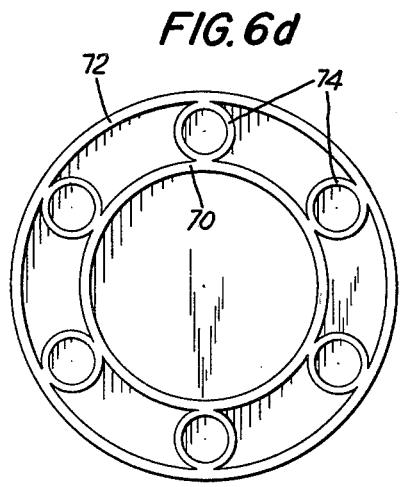

In FIGS. 1–5, the transverse ribs have been shown only as extending along straight radial paths. However, it will be apparent that other rib patterns or paths may be used to connect adjacent beads. Several modified rib patterns for a seal having one sealing bead 70 and one peripheral bead 72 are shown in the plan views of FIGS. 6a through 6d. In FIG. 6a, the ribs 74 are curved; in FIG. 6b, they form a series of triangles with the beads; in FIG. 6c, they follow an oscillatory pattern; and in FIG. 6d, the ribs are in the form of a series of circles. Numerous other modified patterns will be readily apparent.

The seals of this invention may be inserted into crown caps or other container closures by the conventional assembling machines. Also, the seals may be retained in the closures by any of the conventional methods, such as by the use of suitable adhesives, by frictional contact between the skirt of the closure and the seal periphery, or by snapping the seal over protrusions in the skirt of the closure. The inventive seals can be formed by any of the conventional methods used to produce plastic articles, such as injection molding, compression molding, casting, slush molding, cold forming, hot punch forming, and the like.

While various specific forms of the present invention have been described in detail herein, it will be apparent that the same are susceptible of numerous modifications within the scope of the invention. For example, although the invention has been described with particular reference to closure seals for use in crown caps, this invention is equally applicable to seals for use in other container closures, such as screw caps. Of course, the dimensions of the seal will vary with the particular type of closure and container employed.

What is claimed is:

1. A closure seal for a container closure adapted for use on a container having an open mouth and a sealing surface surrounding the orifice of said mouth, said closure seal comprising a plastic disc having: at least two concentric circular beads spaced apart and protruding from both sides of said disc; and at least three equally spaced transverse ribs connecting each pair of adjacent protruding beads, each of said transverse ribs having at least a portion thereof at least as thick as the thicker of the beads which it connects, so that said closure seal will stack vertically with like closure seals and slide without interlocking.

2. A closure seal for a container closure adapted for use on a container having an open mouth and a sealing surface surrounding the orifice of said mouth; said closure seal comprising a plastic disc having: at least two concentric circular beads spaced apart and inwardly from the outer periphery of said disc and protruding from both sides of said disc; a marginal rim on the outer periphery of said disc having a thickness at least as thick as the thicker of said circular beads; and at least three equally spaced transverse ribs connecting each pair of adjacent protruding beads and said marginal rim, each of said transverse ribs having at least a portion thereof at least as thick as the thicker of the beads and rim which it connects, so that said closure seal will stack vertically with like closure seals and slide thereover without interlocking.

References Cited by the Examiner

UNITED STATES PATENTS

| 785,116 | 3/05 | Perry | 220—46 |
|---|---|---|---|
| 1,425,820 | 8/22 | Williams | 217—26 |
| 2,768,762 | 10/56 | Guinet | 215—40 |
| 2,901,139 | 8/59 | Isele-Aregger | 215—40 |

FOREIGN PATENTS

| 192,783 | 11/57 | Austria. |
|---|---|---|
| 586,919 | 4/47 | Great Britain. |
| 671,270 | 4/52 | Great Britain. |

THERON E. CONDON, *Primary Examiner.*

EARLE J. DRUMMOND, *Examiner.*

UNITED STATES PATENT OFFICE
CERTIFICATE OF CORRECTION

Patent No. 3,190,482                                            June 22, 1965

Roger B. Staub et al.

It is hereby certified that error appears in the above numbered patent requiring correction and that the said Letters Patent should read as corrected below.

Column 5, line 18, after "slide" insert -- thereover --.

Signed and sealed this 21st day of December 1965.

(SEAL)
Attest:

ERNEST W. SWIDER                                    EDWARD J. BRENNER
Attesting Officer                                          Commissioner of Patents